Patented Jan. 10, 1950

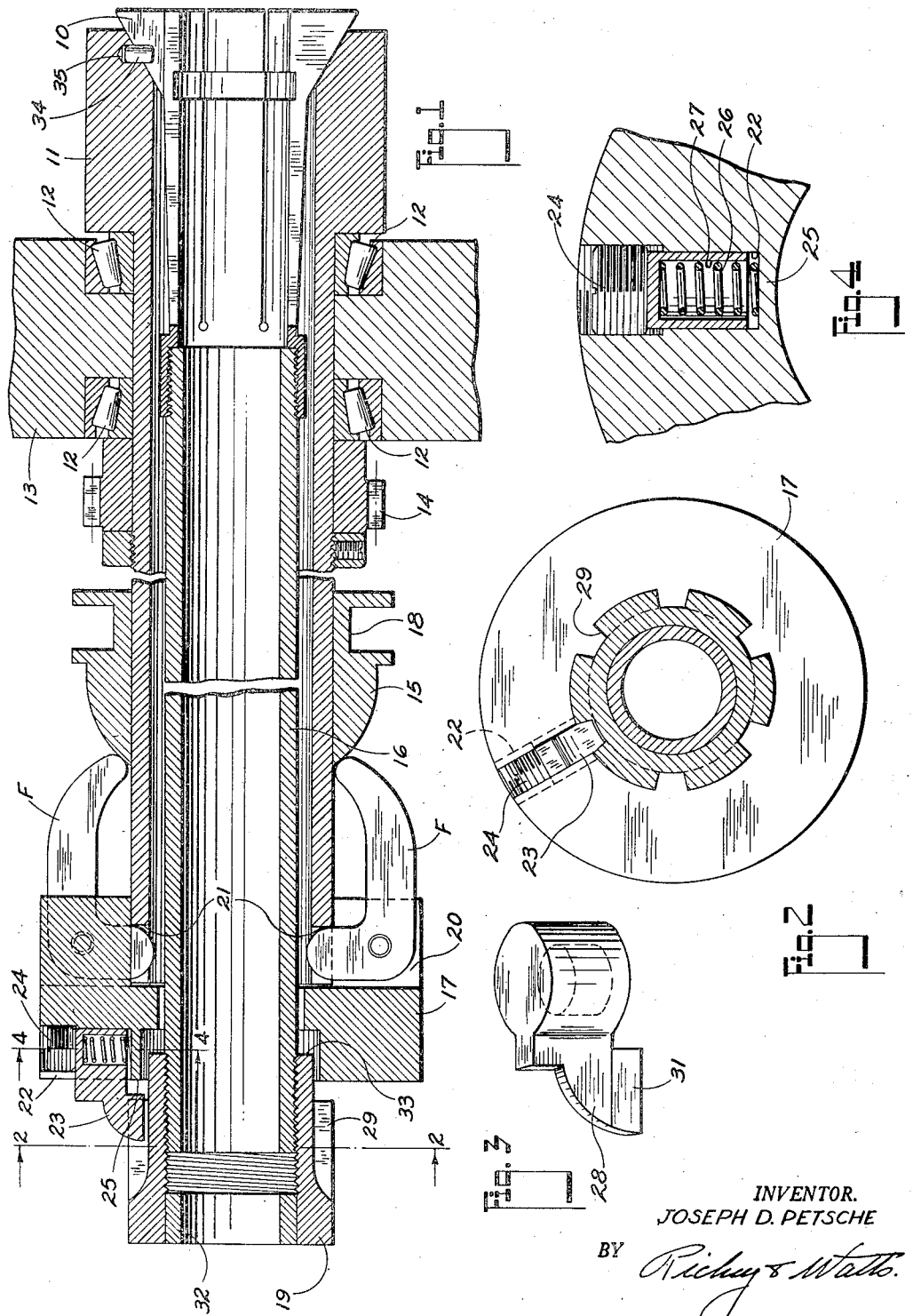

2,493,926

UNITED STATES PATENT OFFICE 2,493,926

NUT LOCK FOR COLLET TUBES

Joseph D. Petsche, Cleveland, Ohio

Application March 26, 1948, Serial No. 17,163

5 Claims. (Cl. 279—51)

This invention relates broadly to collets for automatic screw machines and, more specifically, to an improved lock for the nut employed to control the lineal movement of the collet tube.

In devices of this character heretofore constructed it has been found that the impact of the collet-actuating sleeve against the collet tube retraction nut has impaired the threads therein and thus permitted the nut to creep from its adjusted position to a point that allowed the collet to move into the path of the cutting tools during the indexing movement thereof. Such loss of adjustment usually causes the destruction of the collet or the tools, and in some cases other elements of the machine.

The primary object of the present invention resides in the provision of a locking mechanism for the collet tube nut which will eliminate the foregoing difficulties, and at the same time avoid distortion or mutilation of the threads on the collet tube.

Another object of the invention is to provide a lock for a collet tube nut which is positive in action, as distinguished from a holding device of the type that embodies a frictional gripping element.

Another object of the invention is to provide a lock nut which is designed to eliminate any torsional strain between the nut and collet tube that might develop wear.

Further objects of the invention reside in the provision of a lock which is economic of manufacture and which may be manipulated with ease and dispatch when longitudinal adjustments of the nut are required.

Other objects and advantages more or less ancillary to the foregoing, and the manner in which all the various objects are realized, will appear in the following description, which, considered in connection with the accompanying drawings, sets forth the preferred embodiment of the invention.

Referring to the drawings:

Fig. 1 is a longitudinal sectional view through a collet assembly embodying the improved locking device;

Fig. 2 is a transverse sectional view of the collet tube nut, the section being taken on a plane indicated by the line 2—2 in Fig. 1;

Fig. 3 is a view in perspective of the locking finger; and

Fig. 4 is a sectional view through a portion of the slide, the section being taken on a plane indicated by the line 4—4 in Fig. 1.

As illustrated in Fig. 1, the collet 10 is mounted in a tubular work-holding spindle 11, which in turn is mounted in the conventional manner upon anti-friction bearings 12 seated in the headstock 13 of the machine. The spindle is driven by a pinion 14 entrained in the usual manner with the drive gearing for the machine. The spindle assembly, which is of a conventional form, further comprises a cone 15 mounted for sliding movement on the spindle, a tube 16 which is disposed within the spindle and connected to the collet, and a sleeve 17 for the transmission of reciprocative movement from the cone to the collet tube. The cone is formed with an annular groove 18 for the reception of a yoke (not shown) which is oscillated by a cam coupled with the drive gearing in the machine. The sleeve 17 is bored for running clearance over the collet tube 16 and is counterbored, in one end, for sliding engagement upon the spindle 11 and for free telescopic movement over the diametrically reduced portion of a nut 19 in the other end. The sleeve 17 is machined with slots 20 in the inner end thereof for the reception of fingers or bell cranks F formed for engagement with the cone 15 and abutting engagement with the end wall of slots 21 milled in the work spindle 11. The opposed end of the sleeve is formed with a radially disposed key slot 22 for the reception of a finger lock or keeper 23, which is retained therein by a screw 24 engaged in the tapped outer end of the cylindrical bore of the key slot. The wall 25 defining the bottom of the slot (Fig. 4) constitutes a bearing for the base of the keeper when a screw is impinged therewith, and also serves as a support for a spring 26 mounted in a recess 27 in the lower face of the keeper head. The finger 28 is of rectangular transverse section and is snugly engaged with the side walls of the slot 22 in order to restrain vibrational movement thereof. The finger protrudes beyond the face of the slide and the free end thereof is disposed in depending relation with the upper face of the wall 25. The finger is designed for engagement in slots 29 formed in an enlarged portion of the nut 19 which is threaded on the outer end of the tube 16. The side walls 31 of the finger and slots 29 are preferably tapered in order to prevent any rotational movement of the nut when the keeper is adjusted in its operative position. The outer end of the nut is provided with a wear bushing 32 to support the bar stock fed through the collet tube.

In operation, when the cone is shifted toward the sleeve the outer arms of the bell cranks will ride thereover, thus rocking cranks about their fulcrums and effecting the translation of the sleeve as the inner arms impinge the end wall of the slot 21. As the sleeve moves outwardly the end wall thereof will engage the shoulder 33 of the enlarged central portion of the nut and draw the tapered head of the collet inwardly against its seat in the end of the spindle. During this movement of the collet tube the nut 19 will traverse the finger, it being understood that the finger has been seated within its slot to avoid undue frictional contact. The collet may be restrained from rotation by a pin 34 seated in a keyway 35, though other locking means may be employed if desired.

The collet tube and nut are formed with a relatively fine thread, for example, about twenty threads to the inch; thus, when it is necessary or desirable to alter the reciprocative movement of the collet tube in order to adjust the gripping action of the collet, a movement of a few thousandths of an inch may be obtained by merely revolving the nut to a point two or three slots beyond the position formerly occupied by the finger. Adjustments of the nut are also required when collets are changed to accommodate bars of a different size, or when the diameter of the stock or finish thereof varies, or when the collet-closing action is diminished due to wear.

Since the return movement of the tube and consequent distention of the collet form no part of the present invention, description thereof is deemed unnecessary herein.

From the foregoing it will be readily recognized that the nut may be adjusted to accommodate a liberal range of movement of the tube as may be necessary in changing the collet or minute adjustments compensative of wear; that the nut is positively locked against rotational movement or localized torsional stress upon threads when the finger lock is seated in its operative position; and that adjustments of the actuating mechanism may be made with precision and dispatch.

Although the foregoing description is necessarily of a detailed character, in order that the invention may be completely set forth, it is to be understood that the specific terminology is not intended to be restrictive or confining, and that various re-arrangements of parts and modifications of detail may be resorted to without departing from the scope or spirit of the invention as herein claimed.

I claim:

1. In combination with a machine tool embodying a rotary spindle having a spring collet therein, a collet tube in the spindle, a slidable sleeve on the spindle and bell cranks thereon for retracting said sleeve, mechanism for the retraction of said tube comprising a nut threaded on said tube and disposed for abutting engagement with said sleeve, said nut having a plurality of longitudinal grooves in the outer circumferential wall thereof and a finger in said sleeve mounted for engagement in one of said grooves.

2. In combination with a machine tool embodying a rotary spindle having a spring collet therein, a collet tube in the spindle, a slidable sleeve on said spindle and cranks for retracting said sleeve, mechanism for the actuation of said tube comprising a nut threaded on the tube and engageable with the sleeve, said nut having longitudinal grooves in the circumferential face thereof, an outboard finger in the sleeve engaged in a groove in the nut, and means to restrain rotative movement of the finger.

3. In combination with a machine tool embodying a rotary spindle having a spring collet therein and a collet tube in the spindle, mechanism for retracting said tube comprising a sleeve slidable on said spindle, bell cranks thereon engageable with the spindle for the retraction of the sleeve, a nut threaded on the tube and disposed for abutting relation with the sleeve, shoulders on an outer wall of said nut, a finger engaged with certain of said shoulders, and means in the sleeve to restrain rotative movement of the finger.

4. A lock to restrain rotation of a collet tube in a screw machine comprising a nut threaded on the collet tube and having grooves in an outer wall thereof, a finger mounted for sliding movement in one of said grooves, and means to restrain rotative movement of the finger.

5. In combination with a machine tool embodying a spindle, a collet therein, a draw tube therefor, and a reciprocative sleeve for actuating the tube, mechanism for regulating the length of the reciprocative movement of the tube comprising a nut threaded on the tube and disposed for abutting engagement with the sleeve, said nut having openings in an outer wall thereof and a retractable finger on the sleeve mounted for longitudinal sliding engagement in the openings in the nut.

JOSEPH D. PETSCHE.

REFERENCES CITED

The following references are of record in the file of this patent:

UNITED STATES PATENTS

| Number | Name | Date |
|---|---|---|
| 1,389,975 | Parsons | Sept. 6, 1921 |
| 1,438,546 | Norton | Dec. 12, 1922 |
| 1,804,581 | Wigle | May 12, 1931 |
| 2,375,115 | Kylin | May 1, 1945 |